US012644727B2

(12) United States Patent
Zwiener et al.

(10) Patent No.: US 12,644,727 B2
(45) Date of Patent: Jun. 2, 2026

(54) METHOD FOR ASSISTING A PILOT IN CONTROLLING AN AIRCRAFT, ASSISTANCE SYSTEM FOR AN AIRCRAFT PILOT, AND AIRCRAFT

(71) Applicant: Volocopter GmbH, Bruchsal (DE)

(72) Inventors: Jan Zwiener, Waldbronn (DE); Christoph Seiferth, Stuttgart (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 62 days.

(21) Appl. No.: 18/890,417

(22) Filed: Sep. 19, 2024

(65) Prior Publication Data

US 2025/0146839 A1 May 8, 2025

(30) Foreign Application Priority Data

Nov. 8, 2023 (DE) ..................... 10 2023 130 995.1

(51) Int. Cl.
| | |
|---|---|
| *G01C 23/00* | (2006.01) |
| *B64C 29/00* | (2006.01) |
| *B64D 45/00* | (2006.01) |

(52) U.S. Cl.
CPC ............ *G01C 23/005* (2013.01); *B64C 29/00* (2013.01); *B64D 45/00* (2013.01)

(58) Field of Classification Search
CPC ........ G01C 23/005; B64C 29/00; B64D 45/00

USPC .......................................................... 701/14
See application file for complete search history.

(56) References Cited

U.S. PATENT DOCUMENTS

| | | | |
|---|---|---|---|
| 2013/0134255 A1 | 5/2013 | Fortenbaugh et al. | |
| 2022/0043464 A1* | 2/2022 | Seiferth | ................. B64D 45/00 |

FOREIGN PATENT DOCUMENTS

CN          114056554 A          2/2022

OTHER PUBLICATIONS

"Extended European Search Report", EP Application No. 24202046.9, Jan. 2, 2025, 25 pages.

* cited by examiner

*Primary Examiner* — Isaac G Smith
(74) *Attorney, Agent, or Firm* — FIG. 1 Patents

(57) ABSTRACT

A method for assisting a pilot in controlling an aircraft, an assistance system for an aircraft pilot, and an aircraft are disclosed herein. In one example, a method is disclosed of assisting a pilot in controlling an aircraft having a plurality of lift-generating propulsion devices. The method having steps that include, calculation of momentary control limitations for each control of the aircraft around a roll axis, a pitch axis, a yaw axis, and a total thrust T of the propulsion devices, and display of the calculated control limitations by a display device.

20 Claims, 5 Drawing Sheets

METHOD FOR ASSISTING A PILOT IN CONTROLLING AN AIRCRAFT, ASSISTANCE SYSTEM FOR AN AIRCRAFT PILOT, AND AIRCRAFT

CROSS-REFERENCE TO RELATED APPLICATIONS

This application claims priority from German Patent Application No. 10 2023 130 995.1.5, filed Nov. 8, 2023, the content of which is incorporated herein by reference.

BACKGROUND

Aircraft with fly-by-wire controls, in particular those with electric propulsion along with vertical take-off and landing (eVTOL) mechanism, often do not provide direct haptic feedback that allows the pilot to judge whether a requested control input can be executed with full or only partial power (or not at all). Even if a control input can be fully executed, i.e., if the aircraft can reach a flight state requested by the pilot, the remaining margin of control may not be easily recognizable to the pilot under the given circumstances. In other words, the pilot may not realize whether or what control margin remains to control the aircraft.

The use of haptic feedback, in particular haptic feedback via the control stick of the aircraft, is known from the prior art. Here, actuators cause force feedback that is transferred from the control stick to the pilot.

However, in eVTOL aircraft, especially in aircraft with a multi-rotor design and/or with a large number of propulsion devices that have a fixed and/or adjustable pitch or angle of attack for the individual propulsion devices, there is no clear independence between the control axes. For example, a control input relating to the roll or pitch axis in hover mode can reduce the control reserve along the yaw axis significantly more than on the roll and pitch axis. This results from the fact that such an aircraft can have N propulsion devices in the form of actuators (rotors or propellers together with a propulsion motor; $N \in \mathbb{N}$), each of which can be controlled by regulating the respective rotor revolutions per minute (RPM). The sum of the thrust and torque generated by these N actuators and which can act on the aircraft body, is used to control and stabilize the aircraft. Thereby, none of the propulsion devices can generate unlimited thrust and torque. There are also lower limitations of the controlling, as it is not desirable to switch off an individual actuator completely during flight. While these limitations for the individual actuators are the relevant control limitations from a control theory perspective, these limitations are of low benefit to the pilot in command, especially since saturation of an individual actuator does not mean that control limitations of the aircraft as a whole have been reached. This is due to the fact that a workload can be distributed across all available actuators.

Finally, the force feedback known from the prior art can be ambiguous and confusing for the pilot of an eVTOL aircraft. In terms of flight safety, this represents an intolerable inconsistency in human-machine interaction.

Irrespective of the aforementioned disadvantage, the introduction of active feedback using actuators increases the weight and complexity of the respective aircraft. Furthermore, the large number of additional components also increases the potential for possible sources of error.

SUMMARY

The disclosure relates to a method for assisting a pilot in controlling an aircraft having a plurality of lift-generating propulsion devices. The method substantially comprises a method step in which a plurality of momentary control limitations are calculated and a further method step in which the calculated control limitations are displayed by a display device. The disclosure also relates to an assistance system with a calculation device and a display device, wherein the assistance system is preferably configured to carry out the aforementioned method. The disclosure also relates to an aircraft with such an assistance system.

The techniques of this disclosure satisfy the aforementioned issues of the prior art and/or eliminate the associated disadvantages. In particular, the techniques of this disclosure provide a method, an assistance system, and an aircraft with which the flight safety is increased within the interaction between the pilot and the aircraft without the overall weight of the aircraft having to be increased.

According to the techniques of this disclosure, a method is proposed which is suitable for assisting a pilot in controlling an aircraft with a plurality of lift-generating propulsion devices. In other words, the method is preferably applicable to aircraft having a plurality of propulsion devices, in particular a plurality of rotors. The propulsion devices are configured to generate lift in such a way that the aircraft can take off and/or land, for example take off vertically and/or land vertically. Depending on the angle of inclination of the propulsion devices in relation to the aircraft and/or the angle of inclination of the aircraft in space, the propulsion devices can also be configured to generate forward drive. The aircraft can, for example, be a multicopter, in particular an eVTOL, with several rotors. Preferably, each of the propulsion devices has an invariable angle of inclination in relation to the aircraft.

According to the techniques of this disclosure, the method comprises a method step in which momentary control limitations of the aircraft are calculated. The calculation can, for example, be performed by a calculation device.

For the purposes of the present disclosure, the term "control limitation" refers to the physical limitation for controlling the aircraft. This means, for example, that control of the aircraft outside the control limitation is physically impossible and/or leads to the aircraft crashing. The control limitations can, in particular, correspond to the flight states physically achievable by the aircraft. The control limitations can be, for example, the limitation of a maximum roll angle in relation to the roll axis of the aircraft, a maximum pitch angle in relation to the pitch axis of the aircraft, a maximum yaw angle in relation to the yaw axis of the aircraft, and/or a maximum total thrust. Alternatively or additionally, the control limitations can be configured as a limitation of the roll rate, the pitch rate and/or the yaw rate around the corresponding aircraft axis. Other forms of limitation, for example the limitation of the maximum rotational acceleration and/or the maximum torques around the corresponding aircraft axis, are also possible as control limitations.

For the purposes of the present disclosure, the term "momentary" is understood to mean the current state in terms of time. This means, for example, that the result of the momentary calculation may deviate from a result of the same calculation in the past and/or in the future, in particular, in a past and/or future time step.

According to the techniques of this disclosure, the momentary control limitations are calculated in each case with respect to a control of the aircraft about its roll axis, with respect to a control of the aircraft about its pitch axis, with respect to a control of the aircraft about its yaw axis, and with respect to a control of the total thrust of each of the propulsion devices. Thereby, the physical fact is taken into account according to which an aircraft, in particular an eVTOL, with several lift-generating propulsion devices, preferably in a multicopter, each of the aforementioned control parameters influence each other or are dependent on each other. The control of the aircraft around its roll axis, its pitch axis and/or its yaw axis can in particular depend on the arrangement and/or the momentary thrust output of the individual propulsion devices.

In a further method step of a method according to the techniques of this disclosure, the calculated control limitations are displayed by a display device. The display can, for example, take the form of a scale. By displaying the calculated control limitations, these can be made accessible to the pilot by technical means.

The resulting technical contribution of the techniques of this disclosure improve the human-machine interaction between pilot and aircraft in such a way that the pilot knows the physical performance limitations of the aircraft to be controlled at all the times. A method according to the techniques of this disclosure has the advantageously effect that the pilot is permanently informed of the current limitations or control limitations of the aircraft by the aforementioned technical measures. This enables the pilot to control the aircraft within its physical capabilities at all times. In particular, based on the displayed calculated control limitations the pilot is enabled to control the aircraft within its physical capabilities all the time. In other words, a method according to the techniques of this disclosure avoids operating the aircraft outside its physical capabilities, which simultaneously reduces the risk of a potential crash. Accordingly, a method according to the techniques of this disclosure has, among other things, the advantage that flight safety is increased without the overall weight of the aircraft having to be increased by additional components.

In an exemplary embodiment of the techniques of this disclosure, the control limitations are calculated as a function of the current flight state of the aircraft. Thereby, for example, the current position of the aircraft in space and/or the airflow towards the aircraft can be detected by sensors. Alternatively or additionally, the current control limitations can be calculated as a function of the aircraft's control system.

The term "control of the aircraft" can, in particular, refer to the control of the aircraft about its roll axis, about its pitch axis, about its yaw axis and/or about the control of the total thrust of each of the propulsion devices. Independently of the above, the momentary control limitations can be calculated as a function of the pilot's momentary control inputs and/or as a function of the momentary control signals. The control signals can, for example, be signals from a flight control computer to the propulsion devices. In particular, the target rotation speeds of the rotors and/or the control of the propulsion devices corresponding to the target rotation speeds of the rotors can be control signals within the meaning of the present disclosure.

The aforementioned embodiment advantageously has the effect that each of the current control parameters are taken into account when calculating the current control limitations. Among other things, this has the advantage that the physically present flight state of the aircraft can be recorded particularly accurately by technical means in order to increase the precision of the calculated control limitations.

According to a further exemplary embodiment, the calculation of the control limitations is performed dynamically. In other words, the calculation of the control limitations is performed repeatedly over time. Preferably, the calculation of the control limitations is performed periodically, for example repeatedly at predefined time intervals. Preferably, the time interval between the individual calculation steps is chosen to be so short that the calculation of the control limitations is performed in real time.

A dynamic, in particular periodic, calculation of the control limitations advantageously ensures that the calculated control limitations correspond to the current flight state of the aircraft. This has the advantage that the control limitations provided by the method, sufficiently precisely correspond to the current maximum physically achievable flight state of the aircraft. As a result, flight safety can be further increased.

Preferably, each of the calculated control limitations is displayed separately. In other words, each of the calculated control limitations is displayed separately, in particular at a distance, from the other calculated control limitations. Such a display advantageously has the effect that the individual control limitations can be recognized particularly easily by the pilot. This can have the advantage of further increasing the flight safety. Alternatively, it is also conceivable that the calculated control limitations are displayed at least partially overlaid. This has the advantage that the display of the calculated control limitations uses less display area. In this respect, further information can be displayed in addition to the calculated control limitations.

In a further exemplary embodiment, neutral control values can be displayed. For the purposes of the present disclosure, the term "neutral control value" is understood to mean the neutral output value of the corresponding control parameter. For example, the neutral control value for controlling the aircraft about its roll axis is a roll angle of 0°. The same can also apply to neutral control values for controlling the aircraft about its pitch axis and/or yaw axis. Alternatively or additionally, the neutral control value for controlling the aircraft in relation to the corresponding aircraft axis can also be a rotational speed of 0°/s, a rotational acceleration of 0°/s$^2$, and/or a torque of 0 Nm. The neutral control value in relation to the total thrust of each of the propulsion devices can be 0 Newton (N). In other words, the propulsion devices generate no or negligible lift when the neutral control value is present.

Preferably, the calculated control limitations are each displayed in relation to the respective neutral control value. For example, a control limitation in which the control of the aircraft is not restricted at all or only slightly restricted, can be displayed further away from the displayed neutral control value than a control limitation in which the control of the aircraft is severely restricted. Such a display can advantageously ensure that the individual control limitations can be recognized particularly easily by the pilot. This can have the advantage of further increasing flight safety by providing the pilot with a better overview of the control limits of the aircraft. In other words, the resulting technical contribution improves the human-machine interaction between pilot and aircraft in such a way that the pilot knows the physical performance limitations in relation to the neutral control value of the aircraft to be controlled at all times.

In a further exemplary embodiment of the method, for at least one control limitation, an area within the corresponding control limitation can be visually displayed differently than an area outside the corresponding control limitation. Preferably, the areas within each of the control limitations are visually indicated differently with respect to the areas outside the corresponding control limitations. The visual differentiation can be realized, for example, by using different colors and/or different graphic structures. For example, the area inside the control limitations can be displayed in green color. The area outside the control limitations can be displayed in black. The visually differentiated display can advantageously ensure that the control areas within the individual control limitations can be recognized particularly easily by the pilot. Accordingly, this can further increase flight safety by providing the pilot with a better overview of the control limits of the aircraft. In other words, the resulting technical contribution improves the human-machine interaction between pilot and aircraft in such a way that the pilot can recognize the physical performance limitations of the aircraft more easily.

At least one of the control limitations can have an upper control limit and a lower control limit. Preferably, each of the control limitations each comprise an upper control limit and a lower control limit.

In particular, the upper control limit can be a maximum control value. For example, the upper control limit for controlling the aircraft around its roll axis is a maximum roll angle that the aircraft can achieve. The lower control limit is preferably the maximum roll angle in the opposite direction. The same can also apply to the upper and lower control limit in relation to the pitch axis and/or yaw axis of the aircraft. Alternatively or additionally, the upper control limit in relation to the corresponding aircraft axis can also be a maximum rotational speed in a first rotational direction, a maximum rotational acceleration in the first rotational direction, and/or a maximum torque in a first direction. In relation to the corresponding aircraft axis, the lower control limit can be a maximum rotational speed in a second rotational direction opposite to the first rotational direction. It is also conceivable that the lower control limit in relation to the corresponding aircraft axis is a maximum rotational acceleration in the second direction of rotation and/or a maximum torque in a second direction. With respect to the total thrust of each of the propulsion devices, the upper control limit can correspond to the maximum thrust. In other words, the propulsion devices generate the maximum possible lift at the upper control limit.

Preferably, the upper and/or lower control limit for at least one of the control limitations is visually emphasized when displayed. Particularly preferred, the respective upper and/or lower control limits are highlighted for each of the control limitations. The upper and lower control limits can, for example, be visually highlighted using signal colors like red, and/or a particularly conspicuous graphic display, such as flashing. Additionally or alternatively, the upper and lower control limits can also be indicated by displaying numerical values, in particular dynamically varying numerical values. The visual highlighting can advantageously have the effect that the corresponding control limitations can be recognized particularly easily by the pilot. Accordingly, this can further increase flight safety by providing the pilot with a better overview of the control limits of the aircraft. In other words, the resulting technical contribution improves the human-machine interaction between pilot and aircraft in such a way that the pilot knows the physical performance limitations of the aircraft to be controlled at all times.

Regardless of the above, the upper control limit and the lower control limit can be displayed as parallel lines. Alternatively or additionally, the upper control limit and the lower control limit can be displayed at a distance in relation to the respective neutral control values. Preferably, the distance between the control limitations and the neutral control value varies depending on the calculated momentary control limitation.

In a further exemplary embodiment of the method, a momentary control value is displayed for the control of the aircraft about its roll axis, for the control of the aircraft about its pitch axis, for the control of the aircraft about its yaw axis and/or for the control of the total thrust of each of the propulsion devices. This can advantageously enable the pilot to assess his current control inputs in relation to the calculated control limitations. In other words, such an embodiment uses technical means to inform the pilot of the relationship between his control inputs and the physically possible flight control of the aircraft. This can have the advantage of further increasing flight safety by providing the pilot with a better overview of the control limits of the aircraft. In other words, the resulting technical contribution improves the human-machine interaction between pilot and aircraft in such a way that the pilot knows the physical performance limitations in relation to the momentary control value of the aircraft.

In an advantageous further development of the aforementioned embodiment, the display of the momentary control value changes as soon as the corresponding momentary control value reaches the calculated control limitation. This allows to signalize to the pilot visually by technical means that the pilot has exhausted the physically possible control potential of the aircraft with his control inputs. Alternatively or additionally, the technical means can also provide haptic and/or acoustic signals to the pilot.

Another advantageous further development of a method according to the techniques of this disclosure provides that a graphic marker is used to indicate the momentary control value of the control component/control parameters in question (for example, control of the aircraft around its roll axis, pitch axis, yaw axis and/or of the total thrust). The control value of the component can be dynamically and numerically displayed above or below depending on the position of the graphic marker. The control value of the component can be displayed in combination with displaying the upper and lower limits of the control limitations. The color of the marker, e.g. an arrow or triangle, is preferably changed as a function of a distance of the associated value from the momentary control limitation. Thereby, a display color of the marker can correspond to a display color of the corresponding control limitation when the current control limitation is reached, e.g. is changed to red, while the display color otherwise for example is green. When approaching the control limitation, intermediate colors can also be used, e.g. yellow and/or orange. For example, an acoustic, visual and/or haptic alarm is also triggered when the current control limitation is reached. The marker itself can also be displayed flashing in this case. This can have the advantage of further increasing flight safety by providing the pilot with a better overview of the control limits of the aircraft. In other words, the resulting technical contribution improves the human-machine interaction between pilot and aircraft in such a way that the pilot knows the physical performance limitations of the aircraft to be controlled at all times. In an exemplary further development of the method, the displays for the individual control limitations can be arranged around a central display area. The said central display area can advantageously be used in the conventional manner for displaying instruments etc. of the aircraft. In particular, the so-called "Basic T" familiar to the pilot, preferably comprising a display for the artificial horizon, altimeter, airspeed indicator and gyro, can be displayed in the central display area in order to (also) provide the pilot with the cockpit design familiar from other aircraft. This can make piloting the aircraft even easier.

In a further exemplary embodiment of the method, the control of the aircraft can be described by a vector. In particular, the vector can correspond to the current flight state of the aircraft. Preferably, the vector comprises four components, namely the three components of a torque around the respective aircraft axes and the total thrust of each of the propulsion devices. The three components comprising the torques may depend on the arrangement and/or the momentary thrust of the individual propulsion devices. To calculate the control limitations, the momentary limitations of each of the four components of the vector are determined in particular.

For an exemplary calculation of the vector, a three-dimensional torque vector t (roll, pitch and yaw torque in the unit Nm), which acts on the aircraft body, and the total thrust T (in the unit Newton), which is generated by each of the propulsion devices in the rotor plane as a whole, can be mathematically related to the individual actuator speed commands via the so-called motor matrix M:

$$M \cdot RPM_{cmd}^2 = \gamma$$

In the sense of the techniques of this disclosure, the "vector" comprises an instantaneous single value for each control parameter for a specific time stamp. For example, at a momentary timestamp $t_0$ the vector $\gamma$ can comprise specific values for control parameters for controlling the aircraft around its roll axis, for controlling the aircraft around its pitch axis, for controlling the aircraft around its yaw axis and for controlling the total thrust of each of the propulsion devices. The specific values for control parameters for controlling the aircraft around an axis can have one of the units of degrees, degrees/s, degrees/s$^2$ or radians, radians/s or radians/s$^2$. The specific value for the control parameter for controlling the total thrust of each of the propulsion devices can have the unit Newton (N).

At a time stamp $t_1$ following the time stamp $t_0$, the values of the control parameters within the vector $\gamma$ can be different from the values of the control parameters within the vector $\gamma$ at $t_0$.

The vector $RPM_{cmd}$; with $RPM_{min} \leq RPM_{cmd} \leq RPM_{max}$ can contain the speed commands (for example in the unit of revolutions per minute) and preferably has the dimension N (N=number of propulsion devices), the motor matrix M is a 4×N-matrix, and the vector $\gamma$ has the dimension 4 (containing the three-dimensional torque vector t and the total thrust T). The square of the vector $RPM_{cmd}$ here means squaring element by element. The motor matrix M preferably depends on the position of the individual motors (or the respective rotors) in the aircraft as well as on the torque and thrust that can be generated by the motors/rotors. Alternatively or additionally, the motor matrix M can also depend on the health conditions of the individual motors. The health condition of the individual motors can be represented by weights whose values ranging for example, between [0,1]. It is noted that these values can vary depending on various factors such as air density or (electrical) voltage. In general, however, the motor matrix M for given conditions can be approximated by a constant matrix. In the following, it is assumed that a suitable matrix M is given or known.

As a result of the lower or upper RPM limitations $RPM_{min}$, $RPM_{max}$, the set of all possible permutations of the vector $\gamma$ is enclosed by a 4-dimensional convex hull, a so-called 4D polytope, which defines the control limitations of the aircraft. In other words, the 4D polytope defines the control volume of the control limitations/parameters. For a stable and controlled aircraft, the control parameters are to be within this control volume. If the control parameters (torque in each aircraft axes or total thrust) fall or exceed outside the control volume, there occurs a degradation of the performance of the aircraft. The display of the control parameters can indicate the stable or unstable operating state of the overall aircraft system or the flight control system. This helps the pilot to take action to bring the aircraft stable again or to bring the aircraft back within the 4D polytope. For example, the pilot can manually recover the aircraft using the pilot control stick and thrust regulator or the pilot can push a recovery button such that the aircraft can automatically recover its control state. An advantageous embodiment of the techniques of this disclosure now provides for this 4D polytope to be approximated by a 4D hyper ellipsoid with a possible fit (e.g., according to the method of least squares). For illustration, reference is made to the description of the figures below, in particular FIG. 1.

The constraint of the vector $\gamma$ to this 4D hyperellipsoid can be expressed as a quadratic inequality:

$$(\gamma - \gamma_0)^T \cdot A \cdot (\gamma - \gamma_0) \leq 1$$

with $$A = \text{diag}\left(\frac{1}{L_{max}^2}, \frac{1}{M_{max}^2}, \frac{1}{N_{max}^2}, \frac{1}{T_{max}^2}\right),$$

$$\gamma_0 = (L_0, \ M_0, \ N_0, \ T_0)^T$$

and the scalar values $L_{max}$, $M_{max}$, $N_{max}$ and $T_{max}$, which specify the semi-axis length of the hyper ellipsoid, and the scalar values $L_0$, $M_0$, $N_0$ and $T_0$, which define the center of the hyper ellipsoid.

It is noted that the values for the maximum and center of the ellipsoid axes are constant, while the current limitations along each axis are highly dynamic and regularly changing, depending on the value of the 4D vector $\gamma_{Cmd}$ currently commanded (by the pilot), i.e. depending on a current control input. A good example is a situation with a maximum thrust command that leaves no more room for roll and pitch commands or corresponding maneuvers, as all motors are already running at full speed and there is no more speed difference available to transfer a roll or pitch moment to the aircraft body.

One possible aspect of the techniques of this disclosure now consists in calculating the current control limitations mentioned, e.g. on the basis of the hyper ellipsoid representation explained above and using them for the display. Basically, the aim is to dynamically display to the pilot the current remaining control margin for each of the four available degrees of freedom (here corresponding to roll, pitch, yaw and lift/total thrust). For a given $\gamma_{Cmd}$ at any epoch, i.e. in a given time interval, the control limitations for all axes can be calculated epoch by epoch. These dynamically calculated control limitations can then be displayed to the pilot.

The two individual control limits (upper and lower control limitations) for each of the axes are obtained by determining the two intersection points of the line along the control axis through $\gamma_{Cmd}$ with the hyperellipsoid in the 4-dimensional torque-thrust space.

Assuming that $\tau = \gamma - \gamma_0$, the intersection points of a general ratio $\kappa$ of the ellipsoid along a search direction $v$ are to be found. The following then applies:

$$(\tau + \alpha v)^T A(\tau + \alpha v) = \kappa.$$

This leads to solutions of the type $$\alpha = \frac{-v^{\top}A\tau \pm \sqrt{(v^{\top}A\tau)^2 + (v^{\top}Av)(\kappa - \tau^{\top}A\tau)}}{v^{\top}Av}.$$

If one, in order to find all solutions, for the search directions $v$ successively select all unit directions (i.e. $v=(1, 0, 0, 0)^T$, $(0, 1, 0, 0)^T$ etc.) and additionally set $\kappa=1$, the calculations are simplified (with a slight misuse of the notation) as follows:

The dynamic upper and lower control limits $$\gamma_{max}^{dyn}$$

and $$\gamma_{min}^{dyn}$$

for the four axes, i.e. the momentary control limitations of the vector $\gamma$ in relation to each of the four components (axes of the ellipsoid), can be calculated as follows:

$$c = 1 - (\gamma - \gamma_0)^T \cdot A \cdot (\gamma - \gamma_0) \in [0, 1],$$

$$d = c\gamma_{max}^2 + (\gamma - \gamma_0)^2,$$

$$\gamma_{max}^{dyn} = \gamma_0 + \sqrt{d},$$

$$\gamma_{min}^{dyn} = \gamma_0 - \sqrt{d},$$

whereby $\gamma_{max}=(L_{max}, M_{max}, N_{max}, T_{max})^T$ and $(.)^2$ denotes element-by-element squaring, and the square root is also carried out element by element. In other words, $(.)^2$ involves taking each corresponding pair of elements from the two vectors $\gamma$ and $\gamma_0$, computing their difference and then squaring the result of each difference. The dynamically determined control limitations can then be graphically displayed to the pilot as described in detail above.

The task of the techniques of this disclosure formulated at the beginning is also solved with an assistance system. Advantageous further developments of the assistance system according to the techniques of this disclosure are explained in the following description.

The assistance system according to the techniques of this disclosure realizes the same inventive idea as one of the aforementioned methods. In particular, the assistance system according to the techniques of this disclosure is configured to carry out one of the aforementioned methods. In this respect, each of the aforementioned features, combinations of features and advantages can also be combined with the assistance system or apply to the assistance system.

The assistance system is configured in particular to support a pilot in controlling an aircraft. The assistance system comprises at least one calculation device and one display device. The calculation device and the display device are preferably connected to each other in a signal-communicating manner. Independently of the aforementioned, the calculation device and the display device can be spatially spaced apart from each other or can be formed within a common apparatus.

According to the techniques of this disclosure, the calculation device is configured to calculate the momentary control limitations for controlling the aircraft about its roll axis, for controlling the aircraft about its pitch axis, for controlling the aircraft about its yaw axis and for controlling the total thrust of each of the propulsion devices. The calculation device can be, for example, a processor and/or a computer.

The display device is configured to display the calculated control limitations, in particular the control limitations calculated by the calculation device. The display device can, for example, be a display, in particular a head-up display (HUD) and/or a touchpad with display functionality.

In a further exemplary development of the assistance system according to the techniques of this disclosure, the assistance system comprises an input device. Preferably, the input device is configured as a pilot control stick (PCS). The input device can be directly or indirectly, connected and/or connectable to the calculation device in a signal-communicating manner. For example, the input device can be indirectly connected to the calculation device via one or more other devices. Irrespective of the aforementioned, the input device can be directly or indirectly connected and/or connectable to the display device in a signal-communicating manner. For example, the input device can be indirectly connected to the display device via one or more other devices. Preferably, the input device is connected and/or can be connected to the calculation device in a signaling-communicating manner. For its part, the calculation device can be connected and/or connectable to the display device in a signal-communicating manner. The input device can, for example, be configured to receive the pilot's control commands. Preferably, the pilot's control commands received by the input device are then provided to the calculation device as control input, in particular as signals that correspond to the control input. The pilot's control commands can be measured from various sensors, for example a force sensor or position sensor or any other type, associated with the pilot control stick (PCS) where these sensor signals are then processed to generate the control input by the calculation device.

The calculation device can transmit the control input to the display device in modified and/or unmodified form. The calculation device can modify, in particular edit and/or process the control input as part of a control method. For example, the control method can have a pseudo-control, so that the control method represents a type of mapping specification from control inputs and state towards pseudo-control.

The task of the techniques of this disclosure formulated at the beginning is also solved with an aircraft. Advantageous further embodiments of the aircraft according to the techniques of this disclosure are explained in the following description.

The aircraft, according to the techniques of this disclosure, realizes the same inventive idea as one of the aforementioned methods and/or one of the aforementioned assistance systems. The aircraft according to the techniques of this disclosure preferably comprises one of the aforementioned assistance systems. In this respect, each of the aforementioned features, combinations of features and advantages can also be realized/combined with or by the aircraft.

According to the techniques of this disclosure, in addition to one of the aforementioned assistance systems, the aircraft comprises a plurality of lift-generating propulsion devices. At least one of the plurality of lift-generating propulsion devices comprises a rotor and an electric motor for driving the rotor. Preferably, each of the plurality of lift-generating propulsion devices comprises a rotor and an electric motor for driving the corresponding rotor.

In an exemplary embodiment of the aircraft, the propulsion devices are arranged and/or configured on the aircraft in such a way that the propulsion devices generate lift to maintain the aircraft in a substantially stationary hovering position. In other words, the propulsion devices are arranged and/or configured on the aircraft in such a way that the propulsion devices can generate a vertical lift force.

The techniques of this disclosure can also be described by way of examples by the following aspects. The features listed in the aspects can be combined with the aforementioned features.

Aspect 1 includes a method of assisting a pilot in controlling an aircraft having a plurality of lift-generating propulsion devices, the method comprising the following method steps, calculation of momentary control limitations for each: a control of the aircraft around its roll axis, a control of the aircraft around its pitch axis, a control of the aircraft around its yaw axis and a control of the total thrust T of each of the propulsion devices, and display of the calculated control limitations by a display device.

Aspect 2 includes a method according to aspect 1, wherein the calculation of the control limitations is performed as a function of the momentary flight state of the aircraft and/or the momentary control of the aircraft, preferably as a function of the control of the aircraft around its roll axis, around its pitch axis, around its yaw axis and the total thrust T of the propulsion devices.

Aspect 3 includes a method according to one of the preceding aspects, wherein the calculation of the control limitations is performed dynamically, preferably periodically.

Aspect 4 includes a method according to one of the preceding aspects, wherein the control limitations correspond to the flight states physically achievable by the aircraft.

Aspect 5 includes a method according to one of the preceding aspects, wherein each of the calculated control limitations is displayed separately from the respective other calculated control limitations.

Aspect 6 includes a method according to one of the preceding aspects, wherein at least one of the control limitations is displayed relative to a neutral control value.

Aspect 7 includes a method according to one of the preceding aspects, wherein for at least one control limitation, preferably for all control limitations, an area within the corresponding control limitation is visually displayed differently than an area outside the corresponding control limitation.

Aspect 8 includes a method according to one of the preceding aspects, wherein at least one of the control limitations, preferably all of the control limitations, has an upper control limit and a lower control limit.

Aspect 9 includes a method according to aspect 8, wherein for at least one control limit, preferably for all control limitations, the upper control limit and/or the lower control limit is graphically highlighted, preferably highlighted by a signal color.

Aspect 10 includes a method according to one of the aspects 8 or 9, wherein the upper control limit and the lower control limit are shown as parallel lines within a display field.

Aspect 11 includes a method according to one of the preceding aspects, wherein a momentary control value is displayed for the control of the aircraft about its roll axis, for the control of the aircraft about its pitch axis, for the control of the aircraft about its yaw axis and/or for the control of the total thrust T of all propulsion devices.

Aspect 12 includes a method according to aspect 11, wherein the graphical representation of the momentary control value changes as soon as the momentary control value reaches the respective control limitation.

Aspect 13 includes a method according to one of the preceding aspects, wherein the control of the aircraft is described by a vector comprising four components, namely the three components of a torque about the respective aircraft axes and the total thrust, wherein the three components of torque being dependent on the arrangement and the momentary thrust of the individual propulsion devices, and the momentary limitations of the vector with respect to each of the four components are determined to calculate the control limitations.

Aspect 14 includes an assistance system for assisting a pilot in controlling an aircraft, the assistance system comprising: a calculation device for the calculation of momentary control limitations for each: a control of the aircraft around its roll axis, a control of the aircraft around its pitch axis, a control of the aircraft around its yaw axis and a control of the total thrust T of all propulsion devices, and a display device for displaying the calculated control limitations.

Aspect 15 includes an assistance system according to aspect 14, wherein the assistance system is configured to perform the method according to one of aspects 1 to 13.

Aspect 16 includes an assistance system according to one of the aspects 14 or 15, wherein the computing device and the display device are connected to each other in a signal-communicating manner.

Aspect 17 includes an assistance system according to one of the aspects 14 to 16, wherein the assistance system comprises an input device, preferably a joystick, wherein the input device is connected to the calculation device in a signaling-communicating manner and wherein the input device is configured to receive control commands from the pilot in order to provide the pilot's control commands to the calculation device as a control input.

Aspect 18 includes an aircraft comprising an assistance system according to one of aspects 14 to 17, wherein the aircraft comprises a plurality of lift-generating propulsion devices.

Aspect 19 includes an aircraft according to aspect 18, wherein each of the plurality of propulsion devices comprises a rotor and an electric motor for driving the corresponding rotor.

Aspect 20 includes an aircraft according to one of the aspects 18 or 19, wherein the propulsion devices are arranged such that the propulsion devices generate a vertical lift force.

The different and exemplary features described above can be combined with one another in accordance with the techniques of this disclosure as far as this is technically expedient and suitable. In particular, features disclosed in connection with a method can also be combined with device features and vice versa.

BRIEF DESCRIPTION OF THE DRAWINGS

Combinable features, advantages and embodiments of the techniques of this disclosure are described by way of example with reference to the figures.

DETAILED DESCRIPTION

Figure 1:
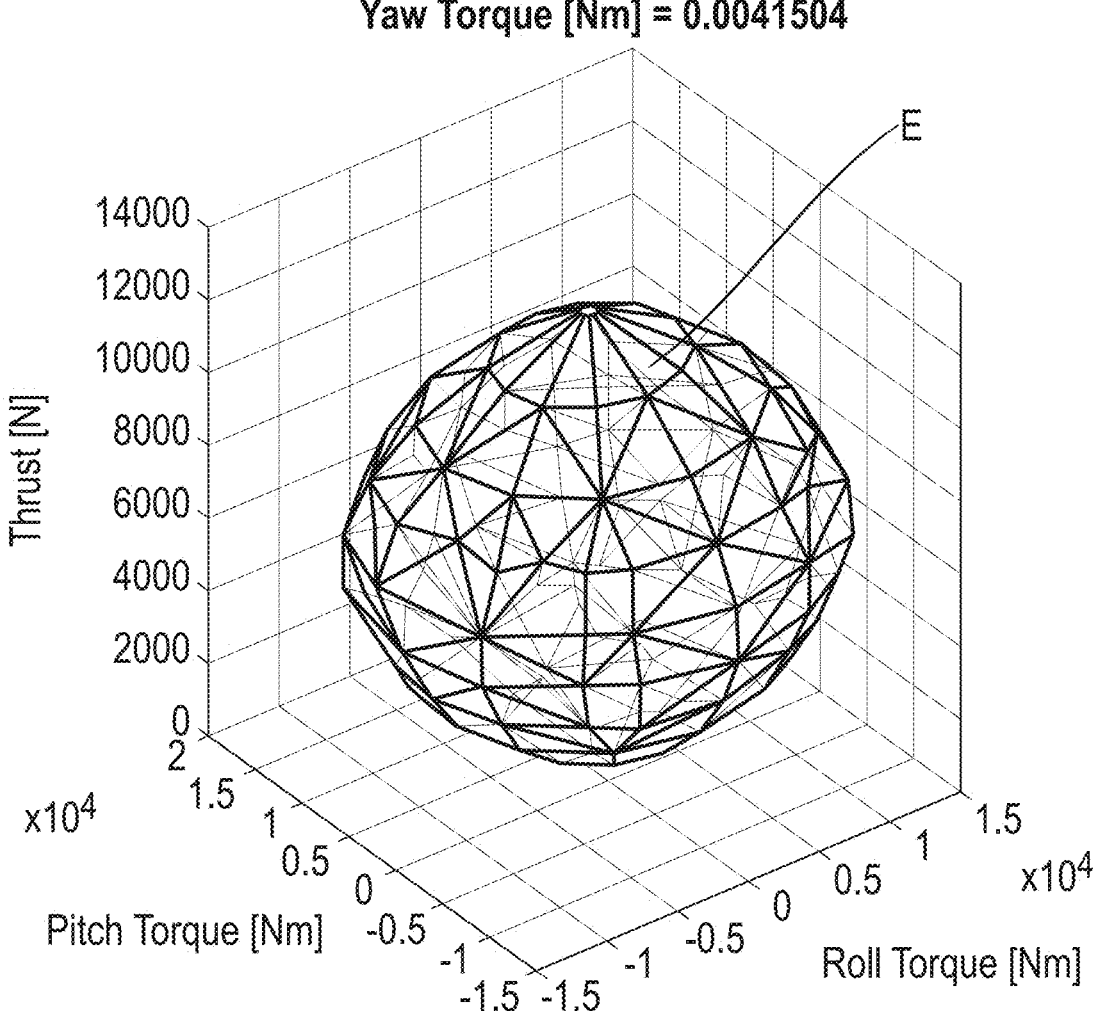
FIG. 1 shows a (hyper) ellipsoid for an aircraft in a pseudo-3D representation in a torque-thrust space.

As an example, FIG. 1 shows the ellipsoid E as described above for an aircraft in a pseudo-3D representation in a torque-thrust space, in which one dimension, in this case the yaw torque, is specified in a fixed manner. Accordingly, the ellipsoid E symbolizes the currently available control volume in the remaining three spatial directions thrust, pitch torque and roll torque.

The ellipsoid E describes the momentary control limitations of a flight state vector $\gamma$ (not shown in FIG. 1), which—starting from a center point of the ellipsoid E—can only lie on its surface or in its interior. The vector $\gamma$ representing the state of the aircraft in terms of its pitch, roll, yaw and total thrust at a particular point of flight time and the vector $\gamma$ lying within the boundary or limits of the ellipsoid is desirable for a stable flight state. The control parameters lying within the ellipsoid will indicate the operable control volume of the aircraft for achieving stable flight conditions. Outside the interior of the ellipsoid defines the unstable and undesirable aircraft region. The interior of the ellipsoid E indicates the physically accessible control range of the aircraft, i.e. those flight states that the pilot can currently realize with the aircraft.

Figure 5:
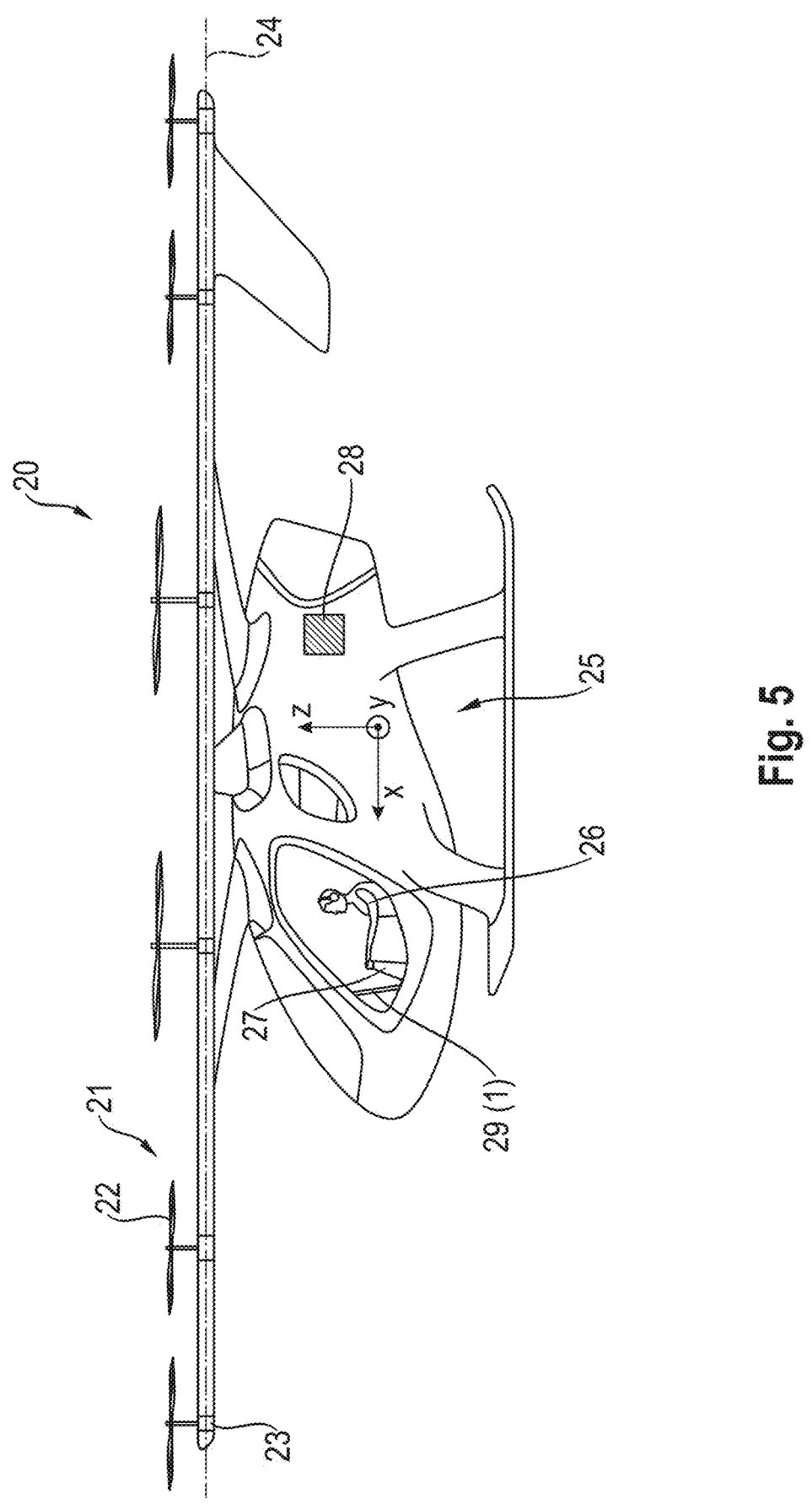
FIG. 5 shows an example of an aircraft.

Based on this mathematical-physical fact, the basic situation according to FIG. 1 can now be clearly and easily shown to the pilot by technical means, preferably with an assistance system 1 and particularly preferably with a display device 29 (see FIG. 5). The resulting technical contribution improves the human-machine interaction between pilot and aircraft in such a way that the pilot knows the physical performance limitations of the aircraft to be controlled at all times. This prevents the pilot from oversteering the aircraft, which may lead to a crash.

Figure 2:
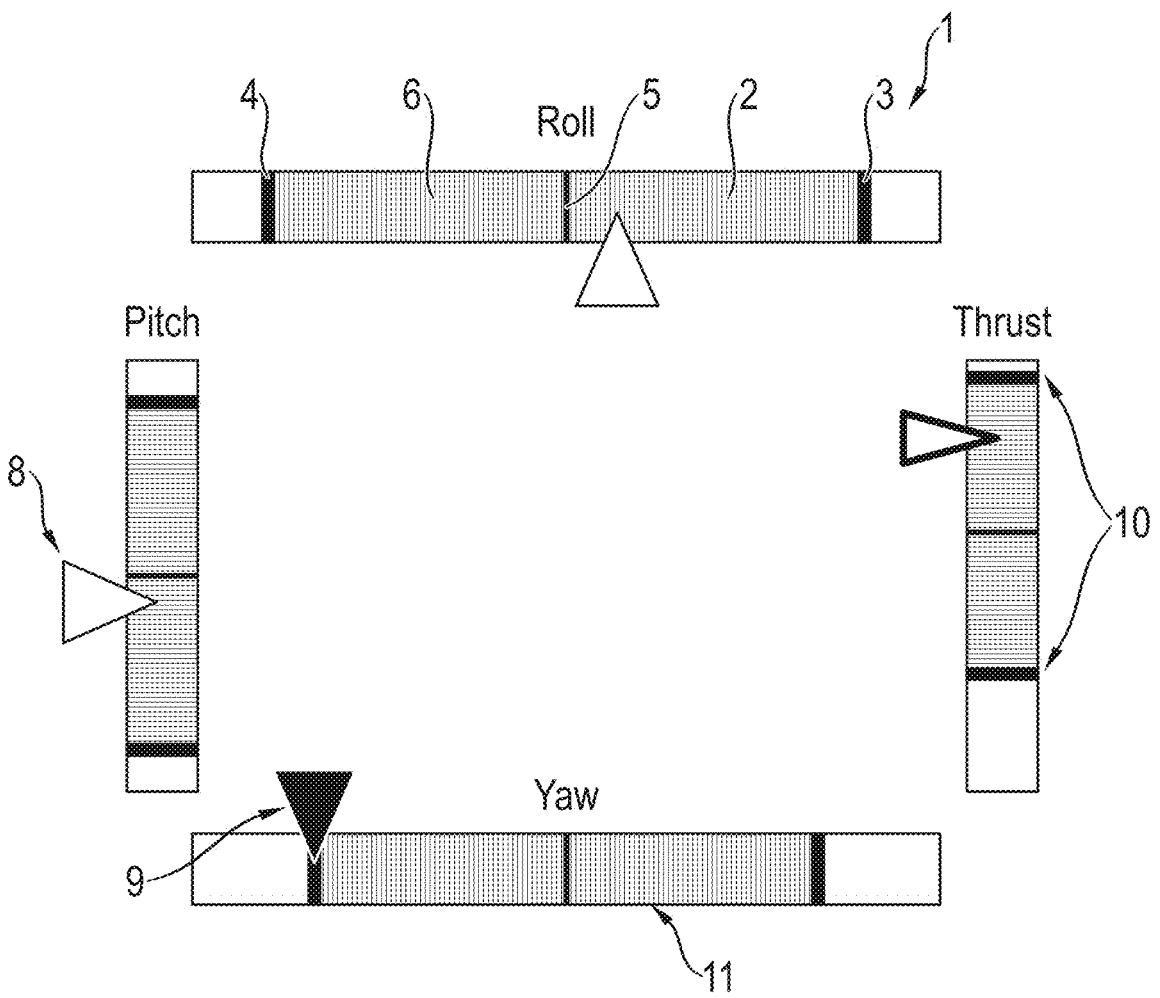
FIG. 2 shows an embodiment example of a dynamic representation of control limitations, as can be generated using an embodiment example of a method for assisting a pilot and/or an embodiment example of an assistance system.

FIG. 2 shows a corresponding representation as can be generated, for example, by means of the method according to the techniques of this disclosure and/or the assistance system 1, in particular the display device 29 (see FIG. 5).

In the course of the techniques of this disclosure and if configured accordingly, the current control limitations of the control volume for each component of the flight condition vector $\gamma$ (not shown in FIG. 2) are dynamically displayed to the pilot. For this purpose, a fixed rectangular display area 2 is provided on a display 1 of the assistance system for each component, i.e. for each control parameter of the aircraft 20 in relation to the roll axis x, the pitch axis y and the yaw axis z (see FIG. 5), which is only explicitly referred to for the roll moment. The displays respectively the display areas 2 for the individual components are arranged around a central display area 2a, in which central display area 2a further control-relevant displays may be presented (not shown). Within a display area 2, the dynamically calculated control value limitations for the relevant component are displayed in red (at 3 and 4), with one of these limitations indicating the possible lower limit for the relevant component and the other limit indicating the associated upper limit. Reference sign 5 shows the average value (mean value of lower limit 4 and upper limit 3). The area 6 between the limitations 3 and 4 is colored green and represents the physically achievable control range for the aircraft (in relation to the component in question).

Reference sign 8 denotes a momentary control value which indicates the currently controlled value of the component of the relevant control limitation 3, 4, in particular with respect to the upper control limit 3 and the lower control limit 4. The momentary control value 8 is white, but changes color (limited momentary control value 9) when it approaches one of the control limitations 3, 4. This is shown symbolically in FIG. 2 for the control in relation to the pitch axis ("pitch") and for the control in relation to the yaw axis ("yaw"). The momentary control value 8 in relation to the pitch axis is still a long way away from the control limitations 3, 4. The limited momentary control value 9 in relation to the yaw axis ("yaw") has already reached the left-hand control limit and is shown in a different color accordingly.

In other words, the yaw-moment has reached its maximum (or minimum) permissible value; more control input $\gamma_{Cmd}$ in this direction is currently no longer possible. Accordingly, the relevant limited momentary control value 9 is colored differently, preferably red, and is located at or on the relevant control limitation.

The thrust is almost at or near its maximum possible value. Accordingly, the momentary control value of the thrust is positioned and also displayed differently. In particular, the frame of the momentary control value is somewhat thicker, and the coloring can also be selected differently. For example, the momentary control value can be colored yellow.

The momentary control values for roll and pitch are close to the neutral control value 5 and are therefore colored white.

The control limitations 3 and 4 as well as the area 6 within the control limitations 3, 4 and the neutral control value 5 are movable dynamically within the (fixed) display fields 2, depending on the current flight status or pilot control command. The display within the display fields 2 does not have to be symmetrical with respect to the field boundaries (rectangular outline), especially for the thrust.

The following special circumstances in FIG. 2 are also explicitly marked there. The momentary control value 8 denotes a current commanded pitch torque (element of the 4×1 vector $\gamma$; not shown) on the aircraft fuselage or its display, which—like other components—is provided at a preferably constant update rate, in particular by the aforementioned calculation device (see FIG. 5), e.g. by a flight control law implemented there. The commanded roll, yaw and thrust value (also elements of the vector $\gamma$) is shown in the other three displays or display fields 2, as already described.

At the limited momentary control value 9, none of the four commanded torque/thrust values (elements of the vector $\gamma$) can exceed the hyperellipse of the control volume and thus the dynamic limitations (see also reference signs 3, 4), as shown in FIG. 2 for the yaw value as an example.

The thick, preferably red, bars or lines indicate the current control limitation for the thrust according to reference sign 10. These bars (corresponding to the aforementioned limitations 3, 4) are continuously moving depending on the state of the aircraft and the pilot's inputs, thus increasing and decreasing the control volume on the respective axis. This also applies analogously to the displays for roll, pitch and yaw.

Figure 3:
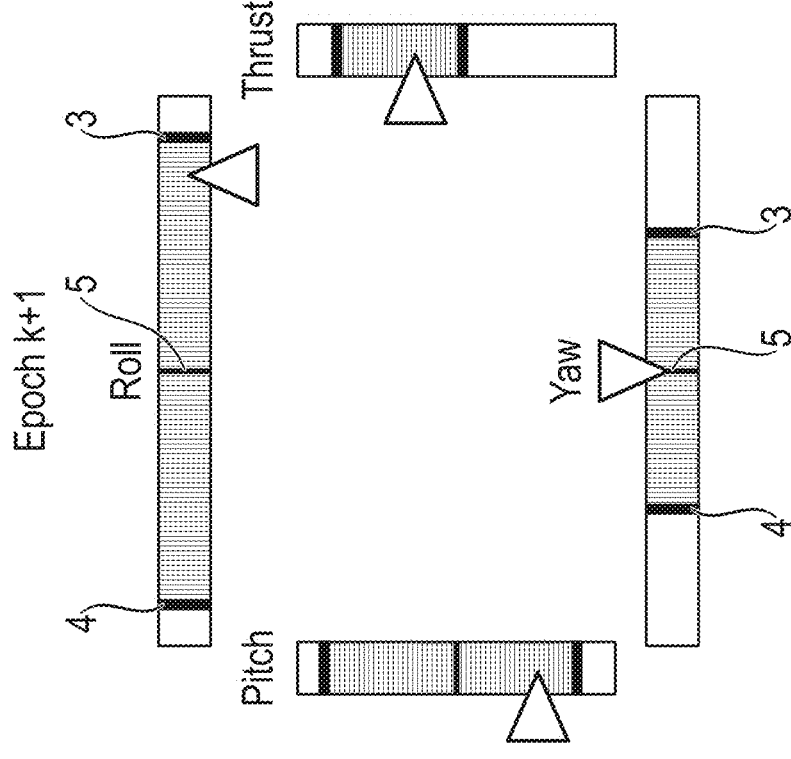
FIG. 3 shows a representation analogous to FIG. 2 for two different points in time (epochs)
Figure 3:
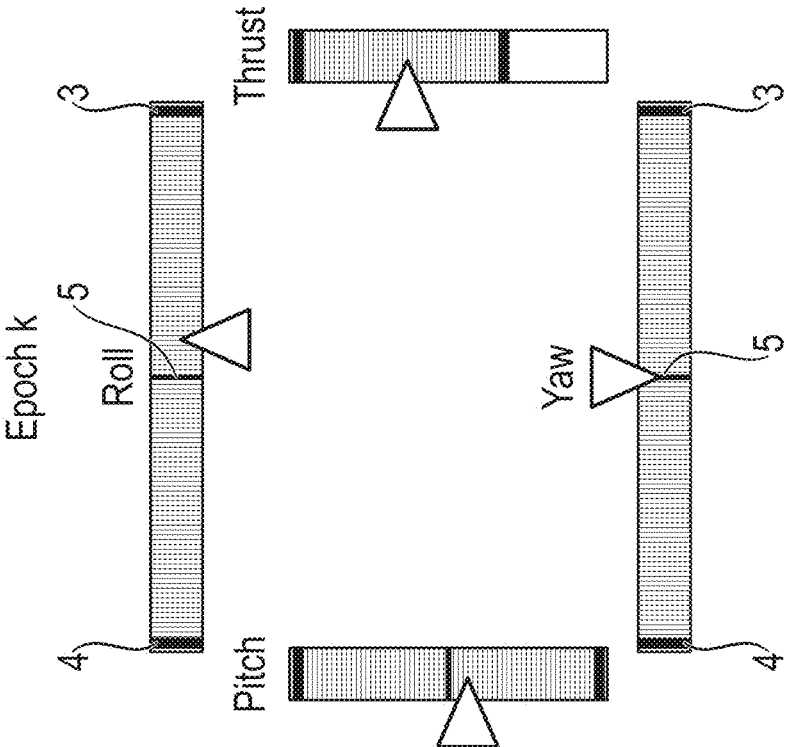

This can also be seen in FIG. 3, in which the thick bars for the upper control limit 3 and the lower control limit 4 change dynamically between an epoch (time) k and a later epoch (time) k+1. It can be seen, for example, that the control volume, in particularly with respect to the yaw axis, is significantly smaller in epoch k+1 (on the right of FIG. 3) than in epoch k (to the left) due to the large roll and pitch commands.

The available control volume is preferably displayed in green (see hatched area described by the reference sign 11 in FIG. 2). The corresponding area in relation to the control around the roll axis of the aircraft (see reference sign 6) changes its size dynamically depending on the position of the limitation bars (control limitations 3, 4).

Figure 4:
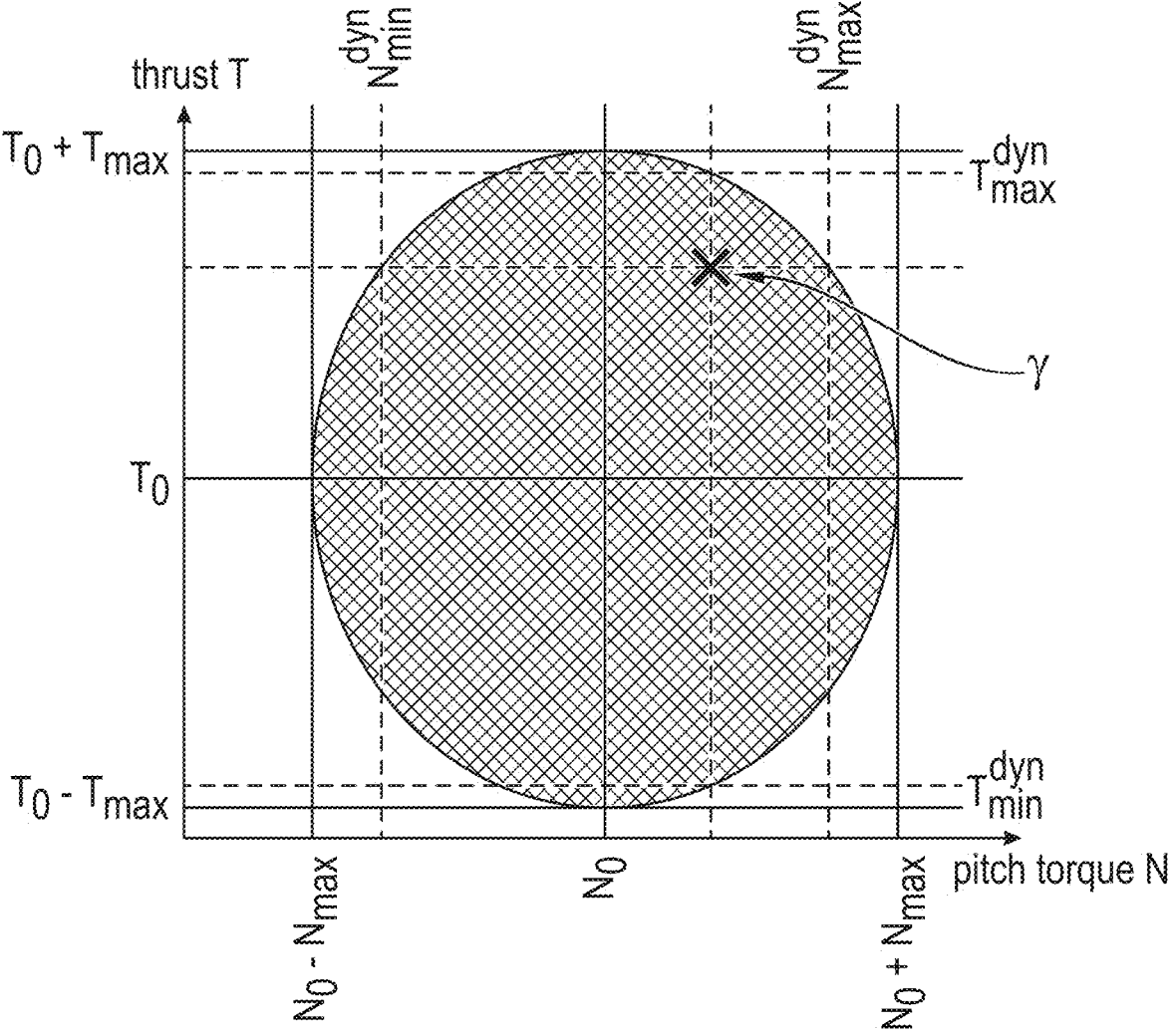
FIG. 4 schematically shows a 2D representation for illustrating the exemplary calculation of the control limitations.

FIG. 4 shows a 2D representation illustrating the calculation of the dynamic limitations, as described mathematically in detail above.

Only the thrust (Y-axis) and the pitching moment (X-axis) are shown here as examples. The scalar values $N_0$ and $T_0$ indicate the center of the hyper ellipsoid, which is located at the intersection of the two associated lines. The scalar values $N_{max}$ and $T_{max}$ describe the corresponding half-axis length of the hyper ellipsoid E. The same applies to the other axes not shown here (roll and pitch).

Depending on the position of the vector $\gamma$, there are dynamic upper and lower control limitations for the individual components of the vector $\gamma$, marked in FIG. 4 as $$N_{max}^{dyn}, N_{min}^{dyn}, T_{max}^{dyn} \text{ and } T_{min}^{dyn}.$$

For each individual component, these also depend on the values of the other components, as already described.

For example, the momentary control limitation $$T_{max}^{dyn}$$

and $$T_{min}^{dyn}$$

for the thrust results by running from $\gamma$ parallel to the ordinate to the points of intersection with the ellipsoid E. The same applies to the pitching moment and its momentary control limitation $$N_{max}^{dyn}, N_{min}^{dyn}$$

with respect to the abscissa (and correspondingly for the other components or dimensions; not shown in FIG. 4).

FIG. 5 schematically shows an example of an aircraft 20 in the form of an eVTOL. The aircraft 20 has a plurality of propulsion devices 21. Each of the propulsion devices 21 comprises a propeller or rotor 22 with a fixed pitch and an electric motor 23 for driving the rotor 22. The rotors 22 are arranged in or parallel to a common level 24, with the rotor blades inclined relative to the level 24 or relative to a support structure (fixed pitch angle).

The aircraft fuselage 25 including a cockpit is located below the level 24. A pilot 26 flies or controls the aircraft 20 by using an input device 27 in the form of a control stick 27. The aircraft 20 further comprises a calculation device 28. The calculation device 28 is connected to the input device 27 in a signal-communicating manner. Reference sign 29 denotes a display device, which in the embodiment example shown in FIG. 5 is configured as a display (screen) 29. The display device 29 is in turn connected to the calculation device 28 in a signal-communicating manner. The calculation device 28, the input device 27 and the display device 29 together commonly form an assistance system 1.

If the pilot 26 now moves the control stick 27 in order to control the aircraft 20, the calculation device 28 receives the corresponding control signals and can perform the calculations as part of the method described above. The dynamically calculated momentary control limitations can then be shown to the pilot 26 via the display 29.

What is claimed is:

1. A method for assisting a pilot in controlling an aircraft having a plurality of lift-generating propulsion devices, the method comprising:

receiving, from a flight control computer of the aircraft, current control parameters exchanged with the plurality of lift-generating propulsion devices for the controlling of the aircraft;

calculating, by a computing device, momentary control limitations based on the current control parameters for each of:

controlling the aircraft around a roll axis (x);

controlling the aircraft around a pitch axis (y);

controlling the aircraft around a yaw axis (z); and controlling a total thrust (T) of the propulsion devices, including dynamically calculating each momentary control limitation by varying an upper control limit and a lower control limit based on a momentary flight state of the aircraft and momentary control inputs conveyed from the current control parameters; and displaying, within a fixed display area for each of the momentary control limitations, the momentary control limitations by a display device, the displaying includes displaying the upper control limit and the lower control limit for each momentary control limitation as movable graphical indicators that move within the respective fixed display area based on changes to the momentary flight state and momentary control inputs to visually assist the pilot in the controlling of the aircraft within physical capabilities of the aircraft.

2. The method according to claim 1, wherein the momentary control limitations are calculated as at least one of a function of a momentary flight state of the aircraft or a momentary control of the aircraft.

3. The method according to claim 2, wherein the momentary control limitations are calculated as a function of the momentary control of the aircraft about the roll axis (x), about the pitch axis (y), about the yaw axis (z), and the total thrust (T) of the propulsion devices.

4. The method according to claim 1, wherein the momentary control limitations correspond to flight states physically achievable by the aircraft.

5. The method according to claim 1, wherein each of the momentary control limitations is displayed separately from each other of the momentary control limitations.

6. The method according to claim 1, wherein at least one of the momentary control limitations is displayed by the display device relative to a neutral control value displayed by the display device.

7. The method according to claim 1, wherein for at least one of the momentary control limitations, an area within that momentary control limitation is visually displayed differently than an area outside that momentary control limitation.

8. The method according to claim 1, wherein for each of the momentary control limitations, an area within that momentary control limitation is visually displayed differently than an area outside that momentary control limitation.

9. The method according to claim 1, wherein for at least one of the momentary control limitations, at least one of the upper control limit or the lower control limit is graphically highlighted.

10. The method according to claim 9, wherein for each of the momentary control limitations, at least one of the upper control limit or the lower control limit is graphically highlighted by a signal color.

11. The method according to claim 1, wherein a momentary control value is displayed for at least one of: controlling the aircraft about the roll axis (x), controlling the aircraft about the pitch axis (y), controlling the aircraft about the yaw axis (z), or controlling the total thrust (T) of the propulsion devices.

12. The method according to claim 11, wherein a graphical representation used to display changes to the momentary control value when the momentary control value reaches a respective control limitation.

13. The method according to claim 1, wherein a momentary control value is displayed for controlling the aircraft about the roll axis (x), for controlling the aircraft about the pitch axis (y), for controlling the aircraft about the yaw axis (z), and for controlling the total thrust (T) of the propulsion devices.

14. The method according to claim 1, wherein calculating the momentary control limitations includes:

describing the controlling of the aircraft by a vector ($\gamma$) comprising four components, including three components of a torque ($\tau$) around each aircraft axis (x, y, z) and the total thrust (T), wherein the three components of the torque ($\tau$) are dependent on an arrangement of the propulsion devices and momentary thrust of each individual propulsion device;

determining momentary limitations of the vector $\gamma$ with respect to each of the four components; and calculating the momentary control limitations based on the momentary limitations.

15. An assistance system for assisting a pilot in controlling an aircraft having a plurality of propulsion devices, the assistance system comprising:

a computing device for calculating momentary control limitations for:

control of the aircraft around a roll axis (x);

control of the aircraft around a pitch axis (y);

control of the aircraft around a yaw axis (z); and control of a total thrust (T) of the propulsion devices, including dynamically calculating each momentary control limitation by varying an upper control limit and a lower control limit based on a momentary flight state of the aircraft and momentary control inputs conveyed from current control parameters exchanged between a flight control computer of the aircraft and the plurality of propulsion devices;

a display device comprising a fixed display area for each of the momentary control limitations for displaying the calculated control limitations, wherein the display device is configured to display the upper control limit and the lower control limit for each momentary control limitation as movable graphical indicators that move within the respective fixed display area based on the momentary flight state and momentary control inputs to visually assist the pilot in the controlling of the aircraft within physical capabilities of the aircraft.

16. The assistance system according to claim 15, wherein the computing device and the display device are connected to each other in a signal-communicating manner.

17. An aircraft comprising:

a plurality of lift-generating propulsion devices; and an assistance system for assisting a pilot in controlling the propulsion devices, the assistance system comprising:

a calculation device for calculating momentary control limitations for:

control of the aircraft around a roll axis (x);

control of the aircraft around a pitch axis (y);

control of the aircraft around a yaw axis (z); and control of a total thrust (T) of the propulsion devices, the calculating including dynamically calculating each momentary control limitation by varying an upper control limit and a lower control limit based on a momentary flight state of the aircraft and momentary control inputs conveyed from current control parameters exchanged between a flight control computer of the aircraft and the plurality of propulsion devices; and a display device comprising a fixed display area for each of the momentary control limitations, for displaying the calculated control limitations, wherein the display device is configured to display the upper control limit and the lower control limit for each momentary control limitation as movable graphical indicators that move within the respective fixed display area based on the momentary flight state and momentary control inputs to visually assist the pilot in the controlling of the aircraft within physical capabilities of the aircraft.

18. The method according to claim 1, wherein a momentary control value indicator is displayed for each of the momentary control limitations, and wherein a graphical representation of the momentary control value indicator changes when the momentary control value approaches a respective upper control limit or lower control limit.

19. The method according to claim 1, wherein an area within each momentary control limitation between the upper control limit and the lower control limit is displayed in a first color, and an area outside the momentary control limitation is displayed in a second color different from the first color.

20. The method according to claim 1, wherein the momentary control limitations are calculated based on interdependencies between control of the aircraft around the roll axis (x), control of the aircraft around the pitch axis (y), control of the aircraft around the yaw axis (z), and control of the total thrust (T), such that a control input relating to one axis affects the control limitations along another axis.

* * * * *